Figure 1:
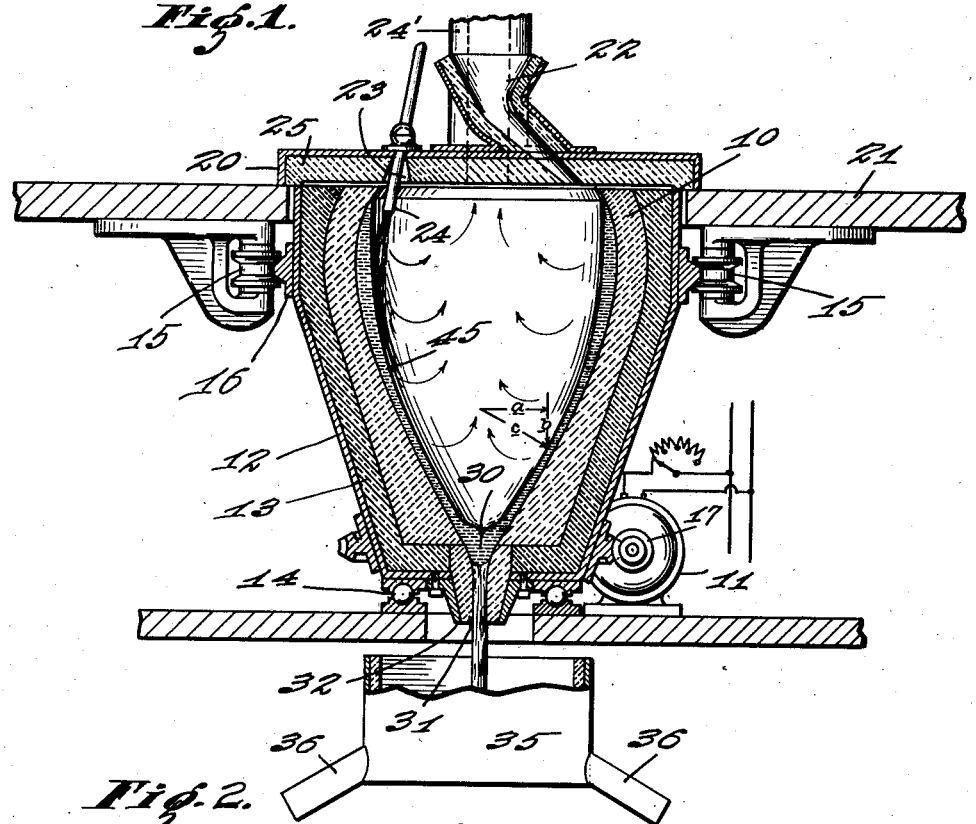

July 2, 1935.  J. FERGUSON  2,006,947

CENTRIFUGAL GLASS MELTING FURNACE

Filed June 14, 1930

Inventor
JOHN FERGUSON,
By Ashley Trask
Attorneys

Patented July 2, 1935

2,006,947

UNITED STATES PATENT OFFICE 2,006,947

CENTRIFUGAL GLASS-MELTING FURNACE

John Ferguson, Indianapolis, Ind.

Application June 14, 1930, Serial No. 461,163

18 Claims. (Cl. 49—53)

It is the object of my invention to improve, simplify, and accelerate the making of vitreous material, such as glass, and so to reduce its cost of manufacture; and particularly to accelerate the plaining or refining of molten vitreous material in order to clear it of the "seeds" or bubbles of air and gas such as are present in unrefined glass, and to make the glass more homogeneous.

Present-day glass furnaces are in general stationary tanks lined with refractory material and adapted to contain a large supply of molten glass which is heated by direct contact with flames that play on its upper surface. Usually, the tank is divided by a transverse bridge wall into a melting chamber and a refining chamber which communicate with each other through an opening in the bridge wall near the bottom of the tank. Unmelted ingredients are periodically added to the molten glass in the melting chamber, while glass is withdrawn from the refining chamber.

Such a furnace possesses many well-recognized disadvantages which result largely from the inefficient method of heating the molten glass from above. Because the glass is heated from above, there are substantially no circulating currents carrying the heat by convection, and the glass at the bottom of the tank must be heated by radiation and by heat conducted through the glass above it; and glass is a poor heat conductor.

Further, in such tanks the only force tending to separate the gas bubbles from the glass is the force of gravity; and, because of the comparatively high viscosity of the molten glass, the force of gravity effects an expulsion of gas which is necessarily at a slow rate. The rate of expulsion of gas in present tanks is so slow in fact that the tanks must be large enough to contain a three or four days' supply of glass, if plain glass is to be obtained; and this is so even when, in attempts to expedite the expulsion of gas by decreasing the viscosity of the glass, the tank temperature is raised to a point near the fusing temperature of the refractory tank-lining, under which conditions deterioration of the lining is markedly increased.

I have discovered that the refining of glass can be greatly accelerated by increasing the bubble-separating force by centrifugal action. In this way I am able to cut down the refining time from days to hours, and even sometimes to less than one hour, and thus to reduce the size of the furnace required for a given output of glass so that instead of being of sufficient capacity to hold several days' output it need be of sufficient capacity only a few hours' output. That is, the size of a furnace having a given output may be but a fraction of that heretofore required. This in itself reduces the cost of glass-making most materially. In addition, by the centrifugal action I am able to expose a relatively greater surface of glass and a relatively less surface of the refractory lining of the furnace to the flames, thus making more efficient the heating of the glass and lessening the destructive action of the flames on the refractory lining. As a result, I also greatly reduce the depth of the glass (measured normal to its free surface), and thus reduce the distance which the entrained bubbles of gas must travel in order to escape from the glass. Moreover, in producing the movement which provides the centrifugal action I also produce certain currents in the glass itself, and these currents, as a result of convection, facilitate both heating and even distribution of heat, and also create longevity in the glass. As a result of these things, I am able to reduce the temperature used in the furnace; for because of the benefits from the greater surface and less depth of glass and of the currents it becomes no longer necessary to heat some of the glass to an unduly high temperature in order to make sure at least that the rest of the glass is melted. Further, by reason both of the reduction of the time the glass is in the furnace and of the reduction of the necessary temperature of operation, the loss of ingredients by volatilization is reduced; and qualities may be obtained in the glass that are not now obtained.

All these things result in saving fuel and other costs of operation, as well as reducing the investment, operating, and maintenance costs.

In addition, there are many other advantages, which will appear hereinafter.

This present application is one of a series, all of which are directed to inventions made by me and utilizing centrifugal force in the refining of glass. Previous applications in this series, in their specific aspects, have been directed to a rotating glass furnace in which the axis of rotation is substantially horizontal; but in the first application of this series, which is Serial No. 390,795, filed September 6, 1929, there are also presented claims directed generically to the utilization of centrifugal force in such refining, regardless of the position of the axis of rotation.

My present invention, however, is directed more specifically to a rotating glass furnace in which the axis of rotation is upright, and desirably substantially vertical.

While the principles of operation of this upright-axis furnace are to a large extent the same as those of the horizontal-axis furnace, some of the principles of operation and some of the results obtained are radically different.

Specifically, I find that in the upright-axis furnace, the refinement of the glass by centrifugal separation is obtained much more completely and rapidly than in a horizontal-axis furnace, and that the discharging of the glass is much simpler than and by an entirely different principle from that in the horizontal-axis furnace. By making the axis vertical, or nearly so, the bubble-separating force may be made so that it is always greater than either the gravitational or the centrifugal components, since the effect of gravity is always to increase the total bubble-separating force, instead of at times tending to increase it and at other times tending to decrease it as is the case when the axis of rotation is horizontal. There are also various other advantages in the vertical-axis furnace, which will appear hereinafter.

Figure 2:
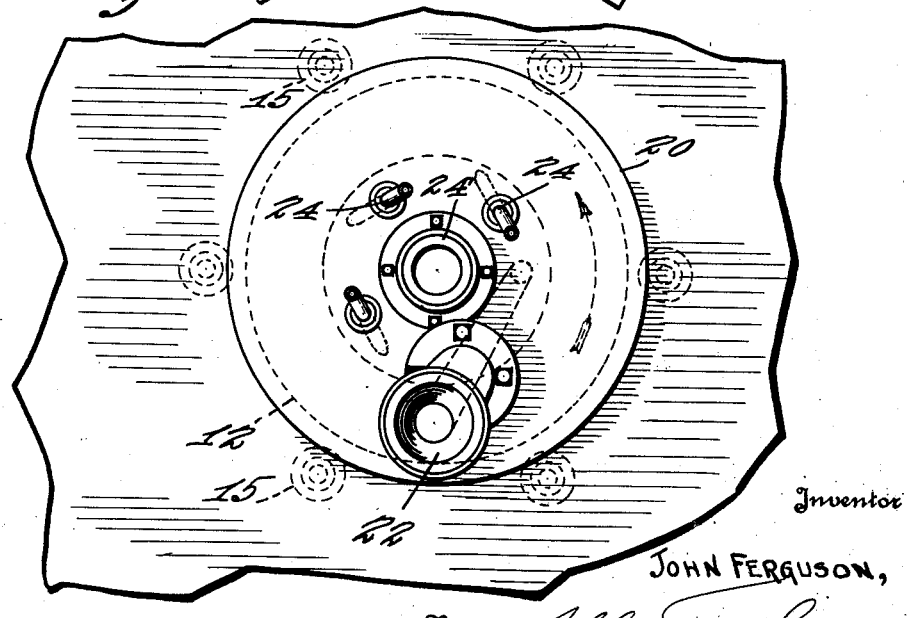

The accompanying drawing illustrates my invention, in a preferred form. In such drawing, Fig. 1 is a vertical section through an upright-axis rotating glass furnace embodying my invention and adapted for the carrying out of my process, the section being a central section save at the cover, where it is a modified section to show both the feed-opening and a burner in the section-plane; and Fig. 2 is a plan of the glass furnace shown in Fig. 1.

The arrangement of parts in the upright-axis rotary glass-furnace may take many forms. In one simple form, shown in the drawing, it consists of a hollow refractory body 10, molded or formed in the general shape of an inverted cone, and means such as a variable-speed electric motor 11 for rotating it about a vertical axis, shown in Fig. 2 as in a counter-clockwise direction; together with means for feeding into the cone the raw ingredients for making the glass, means for firing the cone to melt such ingredients into glass, and means for discharging the molten and refined glass.

The refractory cone 10 is desirably mounted in a steel shell 12, shown as having a lining 13 of heat-insulating material by which it supports the cone 10. The shell 12 is suitably supported for rotation about a vertical axis, as by being mounted on thrust bearings 14 on which it rests and by being guided by a circular series of guide rollers 15 which co-operate with a guide ring 16 on the shell 12 near its upper end. The motor 11 acts to rotate the shell 12 about a vertical axis, as through any convenient drive-gearing 17, shown as a spiral gearing.

A stationary cover plate 20 is located above the hollow conical body 10, and may be supported on a frame 21, which conveniently also carries the guide rollers 15. The cover 20 has a number of openings through it.

One of such openings in the cover 20 is a feed opening 22, conveniently in the form of a funnel, through which batch and cullet may be fed into the cone 10. This feed opening 22 is desirably separated from the vertical axis of the device, and near one side of the opening at the top of the cone 10; and preferably slants outward so that material which is fed through it will be projected or propelled outwardly against the inner surface of the rotating cone at or near the top thereof. Such slant may also have a tangential component, if desired; and is shown as having one in the direction of cone-rotation, so that the material fed in through the feed opening will have a movement in the general direction of such rotation.

The cover 20 also has one or more openings 23, here shown as three in number, which are openings for burners 24 through which flames are projected into the interior of the cone 10. These burner openings 23 are desirably arranged in an annular series around the axis of cone-rotation, and directed obliquely outward, so that the flames from the burners 24 strike the inner surface of the cone 10 or of the glass within the cone. The burners 24 are desirably angularly adjustable.

In addition, the cover 20 has a central flue opening 24', through which the gases are discharged.

The under surface of the cover 20 may be lined with a refractory 25, which will conveniently also extend upward into or through the feed opening 22, the burner openings 23, and the flue opening 24'.

At the bottom of the rotating cone 10 there is an outlet opening 30, through which the refined glass may be withdrawn by gravity. This opening 30 extends not only through the bottom of the refractory cone 10, but desirably continues through an axial tubular outlet-piece 31 also made of refractory material and held in place in the shell 12 and its lining 13 by a clamping plate 32.

The outlet 30 may discharge into anything desired. While this discharge may be directly into a glass-molding machine, if such machine has sufficient capacity to take care of the output of the furnace, in the case of furnaces of larger capacity the outlet 30 may discharge its molten glass as shown into a heated glass-supply tank 35; in which a pool of molten glass is held temporarily, and further conditioned if required, although that is usually not necessary. When this glass-supply tank 35 is used, it may have several feed outlets 36, each of which may supply its individual glass-molding machine. I have shown the tank 35 and its feed outlets 36 merely diagrammatically, as my present invention is not concerned with the details thereof.

In operation, the furnace and the glass material within it are heated by flames from burners 24. Desirably, when the furnace is first placed in use, it is heated preliminarily before materials for the glass-making are introduced. This preliminary heating may be with the furnace stationary or in rotation; but in any case it is desirable to set the furnace into rotation before materials for glass-making are introduced into it, and thereafter to maintain it in rotation throughout the glass-making operation.

When the furnace is hot, and is in rotation, the raw materials for the glass-making are fed into it by way of the feed opening 22. Such feed opening, as already stated, desirably slants so that the materials which it conveys into the furnace strike the walls of the rotating furnace near the top thereof; and, as shown, also in the direction in which the furnace itself is rotating, or counter-clockwise in Fig. 2. The raw materials may be fed either dry, dampened, or wet, and either in powdered form or in briquette form.

When the raw materials enter the rotating furnace at the top, they are held outward against the walls of the furnace by centrifugal force, and are melted by the heat of the flames from the burners 24 to form glass. This glass whirls with the cone 10, and spreads itself somewhat over the inner surface of the cone 10, in a layer of molten glass 45. This spreading depends upon the amount of glass-forming material and glass present, and on the speed of rotation and the shape of the inner surface of the hollow cone. Such speed of rotation is made sufficiently high so that the molten glass and the ingredients for the glass are held outward by centrifugal force upon the inner surface of the hollow cone 10 and so that the molten glass may be spread out over a large part of such surface in a comparatively thin layer with a deeply cupped free inner surface. Such speed of rotation is also sufficiently high so that such free surface of the whirling molten glass has portions which are quite steeply inclined to their plane of rotation, at an angle of at least 45° and desirably in excess of 80°; which means that the resultant force which acts on the glass at such portions of the free surface, and which is of course substantially normal to the free surface in order to hold it in substantial equilibrium, has components $a$ and $b$ due to centrifugal force and to gravity respectively, with the centrifugal component $a$ equal to the gravitational component $b$ if such angle is 45° and something over five times as large if such angle is 80°. The shape of the interior of the cone 10 is so chosen that at the normal speed of rotation the spreading out of the glass and the materials for making the glass will cause the glass to rise nearly to the top of the rotating cone due to the cupping downward of the center of the whirling glass and the rising at the edges thereof, and at that speed will cover the inner surface of the rotating cone fairly evenly from the plane of greatest diameter to the bottom; although desirably with a slightly greater depth (normal to the free surface) of glass and glass materials near the top at the plane of greatest diameter of the hollow cone than at lower points, though this is not necessary. The hollow cone is made smaller in diameter directly at the top than at a slight distance below the top, to counteract any tendency that might arise for the glass or glass-making materials to spill over at the rim. I have tried to indicate this diagrammatically in Fig. 1.

I believe the interior surface of the rotating molten glass takes substantially the shape of a paraboloid of revolution; probably with some distortion, especially at and near the top by reason of the turbulence caused by the escaping bubbles of gas and by the feeding in of additional glass-making materials. Save at the top, the inner surface of the cone 10 is desirably made of a shape that substantially conforms to a similar paraboloid of revolution; but I now think it is desirable to vary that somewhat to provide for a greater depth of glass (normal to the free surface) on the interior of the cone 10 at and near the plane of greatest diameter, and to turn in the upper part of such inner surface as already stated in order to avoid spilling over.

The material for the making of the glass, after being discharged into the cone 10 through the feed opening 22, melts while in the upper part of the cone 10. As new material enters at the top, there is a redistribution of the material, which meanwhile has melted; and the molten glass may be caused to work its way gradually downward along the inside of the hollow cone 10. The speed at which it does this may be controlled, if necessary, by varying the speed of the motor 11; so that the rate of travel downward of the molten glass may be retarded or even stopped by increasing the speed of the motor 11, and may be accelerated by decreasing such speed, as the relation between the components due to gravity and to centrifugal force is varied.

As the material for the glass melts, the molten glass initially formed contains many bubbles of gas—which the glass-maker calls "seed". By the action of centrifugal force, and the comparative shallowness of the layer of molten glass as measured in the direction normal to the inner surface of the rotating glass, these "seed" or bubbles of gas, are rapidly cleared from the glass, and escape at the inner or exposed surface of the hollow whirling mass of molten glass. This separation of the "seed" is very rapid, in comparison with the separation at present obtained; both on account of the fact that the centrifugal force may be made far greater than the force of gravity now used and because of the comparatively thin layer of glass through which the bubbles must travel.

By the time the molten glass reaches the bottom of the hollow cone 10, to which position it may be made to travel as new glass-material introduced at the top necessitates a redistribution of the glass within the cone, it is substantially plain and free from "seed". This plain glass is drawn off from the bottom, by way of the outlet opening 30, by the action of gravity on the glass; and drops into the tank 35 or directly into a molding machine as is desired. If the supplementary tank 35 is used, further conditioning may take place in that tank.

The operation may be continuous or by unit charges. If continuous, the speed of rotation of the cone 10 may be maintained substantially constant, and there may be a substantially continuous feeding of batch into the furnace through the feed opening 22 and a continuous withdrawal of the plain and refined glass from the bottom of the furnace by way of the opening 30. On the other hand, if the operation is by unit charges, a charge of batch and cullet sufficient for one operation is fed into the preheated furnace, and the furnace operated at a sufficient speed of rotation so that there will be no discharge of glass through the outlet opening 30. In that case, the glass-making material and the molten glass made therefrom remains above the discharge opening, and is therefore retained in the furnace. Then the speed of rotation of the cone may be reduced (or stopped, if necessary,) to permit the molten glass to flow downward, since centrifugal force decreases with the decrease in speed, until the molten glass flows out through the outlet opening 30. The flames from the burners 24 will normally maintain the outlet opening 30 sufficiently hot for this; but if for any reason additional heating of the outlet opening 30 is required, either in the continuous or unit-charge method of operation, such additional heat may be applied in any convenient way.

I claim as my invention:

1. A rotary glass furnace, comprising a hollow refractory body mounted to rotate about an upright axis, means for supplying glass-making material to said hollow body from the top thereof, and means for supplying heating flames to said furnace from the top thereof, said rotary refractory body having an outlet for molten glass at the bottom thereof substantially along its axis.

2. A rotary glass furnace, comprising a hollow refractory body mounted to rotate about an upright axis, means for supplying glass-making material to said hollow body, and means for heating the contents of said furnace, said rotary refractory body having an outlet for molten glass at the bottom thereof substantially along its axis.

3. A rotary glass furnace, comprising a hollow refractory body mounted to rotate about an upright axis, means for supplying glass-making material to said hollow body from the top thereof, and means for supplying heating flames to said furnace from the top thereof, said rotary refractory body having an outlet for molten glass at the bottom thereof.

4. A rotary glass furnace, comprising a hollow refractory body mounted to rotate about an upright axis, means for supplying glass-making material to said hollow body, and means for heating the contents of said furnace, said rotary refractory body having an outlet for molten glass at the bottom thereof.

5. A rotary glass furnace, comprising a hollow refractory body mounted to rotate about an upright axis, a stationary cover for said rotary hollow refractory body, said stationary cover being provided with a feed opening through which material for making glass may be fed to the interior of said hollow refractory body and means for heating the contents of said furnace during the rotation thereof.

6. A rotary glass furnace, comprising a hollow refractory body mounted to rotate about an upright axis, a stationary cover for said rotary hollow refractory body, said stationary cover being provided with a feed opening through which material for making glass may be fed to the interior of said hollow refractory body, said hollow rotating refractory body being provided at the bottom with an outlet for molten glass and means for heating the contents of said furnace during the rotation thereof.

7. A rotary glass furnace, comprising a hollow refractory body mounted to rotate about an upright axle, a stationary cover for said rotary hollow refractory body, said stationary cover being provided with a feed opening through which material for making glass may be fed to the interior of said hollow refractory body, said hollow rotating refractory body being provided at the bottom with an outlet for molten glass extending substantially along the axis thereof and means for heating the contents of said furnace during the rotation thereof.

8. A rotary glass furnace, comprising a hollow refractory body mounted to rotate about an upright axis, a stationary cover for said rotary hollow refractory body, said stationary cover being provided with a feed opening through which material for making glass may be fed to the interior of said hollow refractory body, said feed opening being slanting to feed the material outward against the inner surface of the rotating refractory body and with a tangential component in the direction in which said hollow body is rotating and means for heating the contents of said furnace during the rotation thereof.

9. A rotary glass furnace, comprising a hollow refractory body mounted to rotate about an upright axis, a stationary cover for said rotary hollow refractory body, said stationary cover being provided with a feed opening through which material for making glass may be fed to the interior of said hollow refractory body, said feed opening being slanting to feed the material in the direction in which said hollow body is rotating and means for heating the contents of said furnace during the rotation thereof.

10. A rotary glass furnace, comprising a hollow refractory body mounted to rotate about an upright axis, a stationary cover for said rotary hollow refractory body, said stationary cover being provided with a feed opening through which material for making glass may be fed to the interior of said hollow refractory body, said feed opening being slanting to feed the material outward against the inner surface of the rotating refractory body and means for heating the contents of said furnace during the rotation thereof.

11. The process of continuously refining glass, which consists in constantly whirling the glass while molten about an upright axis at sufficient speed to produce on some of the molten glass a radial centrifugal-force component that is greater than the force of gravity, and continuously feeding glass-making materials into the interior of the molten glass while the same is being whirled.

12. The process of continuously refining glass, which consists in constantly whirling the glass while molten about an upright axis at sufficient speed to produce in the molten glass a free internal surface of rotation which has portions forming an angle greater than forty-five degreees (45°) to a plane perpendicular to the axis of rotation, and continuously feeding glass-making materials into the interior of the molten glass while the same is being whirled.

13. The process of continuously refining glass, which consists in constantly whirling the glass while molten about an upright axis at sufficient speed to produce a cupping of the free surface of the glass and a production in portions of the whirling glass of a bubble-expelling force which is the resultant of both gravitational and centrifugal components and in which the centrifugal component exceeds the gravitational component in value, and continuously feeding glass-making materials into the interior of the molten glass while the same is being whirled.

14. The process of continuously refining glass, which consists in constantly whirling the glass while molten about an upright axis at sufficient speed to produce a cupping of the free surface of the glass and a production in portions of the wihrling glass of a bubble-expelling force which is the resultant of both gravitational and centrifugal components and in which the centrifugal component exceeds the gravitational component in value at least five times, and continuously feeding glass-making materials into the interior of the molten glass while the same is being whirled.

15. The process of continuously refining glass, which consists in constantly whirling the glass while molten about an upright axis at sufficient speed to produce a cupping of the free surface of the glass and a production in portions of the whirling glass of a bubble-expelling force which is materially greater than the force of gravity, and continuously feeding glass-making materials into the interior of the molten glass while the same is being whirled.

16. The process of continuously refining glass, which consists in constantly whirling the glass while molten about an axis at sufficient speed to produce a cupping of the free surface of the glass and a production in portions of the whirling glass of a bubble-expelling force which is the resultant of both gravitational and centrifugal components and which at all points in the rotation is greater than either of said components, and continuously feeding glass-making materials into the interior of the molten glass while the same is being whirled.

17. The process of continuously refining glass, which consists in melting the glass in a furnace which is constantly rotated about an upright axis at sufficient speed to cause the molten glass and the ingredients for making the glass to extend upward along the sides of the rotating furnace materially above the level they would take by gravity; and thus to increase the exposed surface of the molten glass, decrease the maximum separation of the glass from the flames, and protect some of the refractory lining of the furnace from the direct action thereon of the flames, and continuously feeding glass-making materials into the interior of the molten glass while the same is being whirled.

18. The process of continuously refining glass, which consists in constantly whirling the glass while molten about an axis at sufficient speed to produce a cupping of the free surface of the glass and a production in portions of the whirling glass of a bubble-expelling force which is substantially constant in any given plane of rotation at the same distance from the axis of rotation, and continuously feeding glass-making materials into the interior of the molten glass while the same is being whirled.

JOHN FERGUSON.